(12) United States Patent
Smith

(10) Patent No.: US 10,710,668 B2
(45) Date of Patent: Jul. 14, 2020

(54) HANDLEBAR MOUNT ASSEMBLY

(71) Applicant: Lance Smith, Southaven, MS (US)

(72) Inventor: Lance Smith, Southaven, MS (US)

( * ) Notice: Subject to any disclaimer, the term of this patent is extended or adjusted under 35 U.S.C. 154(b) by 0 days.

(21) Appl. No.: 16/242,698

(22) Filed: Jan. 8, 2019

(65) Prior Publication Data

US 2019/0144067 A1  May 16, 2019

Related U.S. Application Data

(63) Continuation of application No. 15/224,408, filed on Jul. 29, 2016, now Pat. No. 10,207,766.

(60) Provisional application No. 62/295,595, filed on Feb. 16, 2016.

(51) Int. Cl.
   *B62K 21/14* (2006.01)
   *B62K 21/20* (2006.01)

(52) U.S. Cl.
   CPC .............. *B62K 21/14* (2013.01); *B62K 21/20* (2013.01)

(58) Field of Classification Search
   CPC ........ B62K 21/08; B62K 21/14; B62K 21/18; B62K 21/20; B62K 21/22; B62K 21/24; F16B 7/04; F16F 15/00; G06Q 50/18
   See application file for complete search history.

(56) References Cited

U.S. PATENT DOCUMENTS

| 6,332,625 | B1 * | 12/2001 | Fukunaga | B62K 21/20 180/222 |
| 6,712,541 | B1 * | 3/2004 | Henricksen | B62K 21/04 403/344 |
| 10,207,766 | B2 * | 2/2019 | Smith | B62K 21/20 |

* cited by examiner

*Primary Examiner* — Adam D Rogers
(74) *Attorney, Agent, or Firm* — C. Brandon Browning; Maynard, Cooper & Gale, PC

(57) ABSTRACT

A handlebar mount assembly for isolating a cycle handlebar from vibrations emanating from operation of a cycle, the assembly including a bottom bracket assembly configured for attachment to a cycle steering mechanism, a top bracket assembly configured for attachment to the bottom bracket assembly, a pair of polymer sleeves configured for placement around the handlebar, a tension clamp configured for clamping the handlebar and a clamp bushing configured for placement between the tension clamp and the top bracket assembly. The sleeves prevent direct contact between the top bracket assembly and the bottom bracket assembly, and the bushing prevents direct contact between the tension clamp and the top bracket assembly. In this manner, the handlebar mount assembly prevents direct and indirect contact of the steering mechanism to the handlebar through the metal components of the handlebar mount assembly.

13 Claims, 10 Drawing Sheets

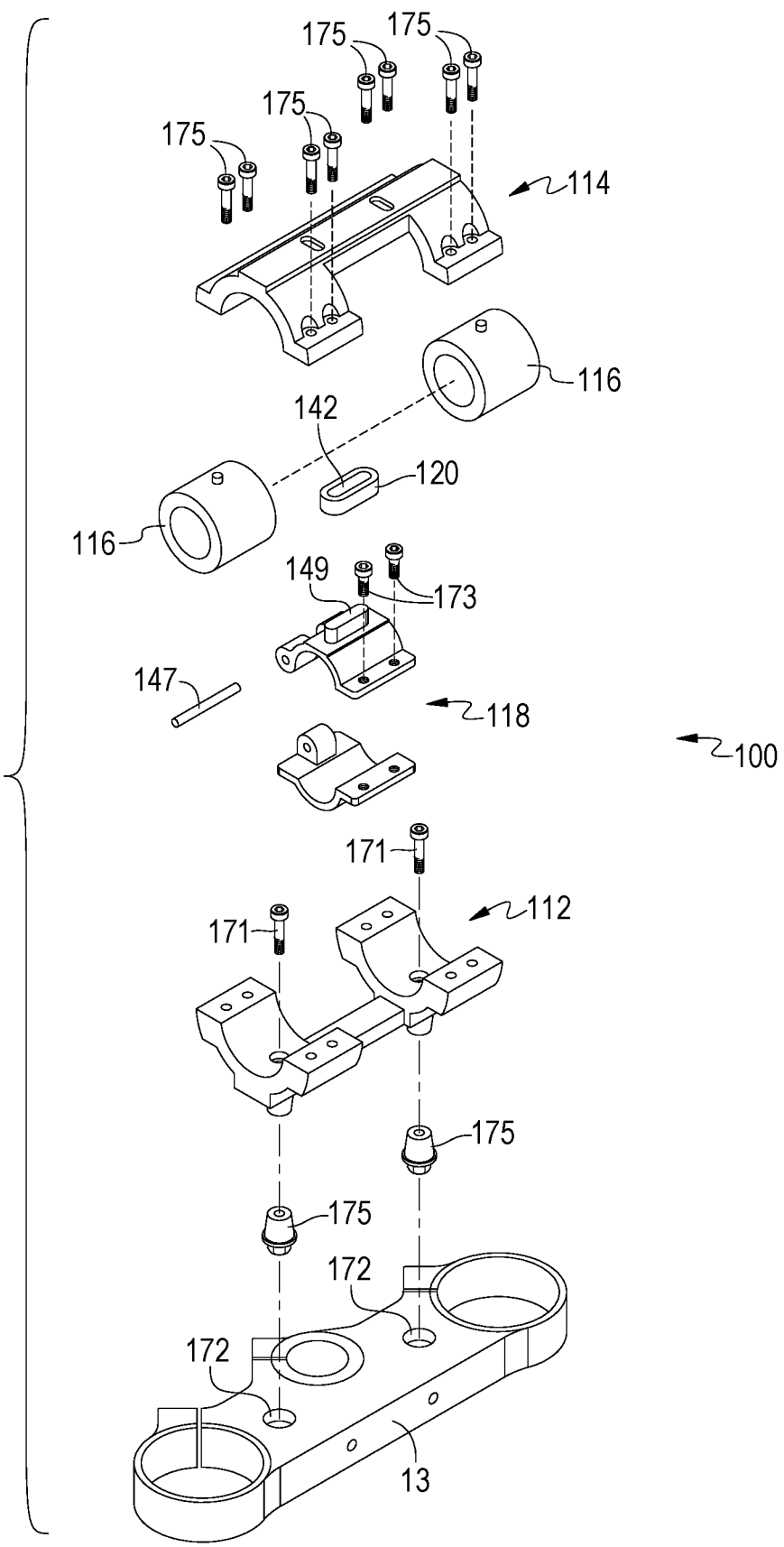

HANDLEBAR MOUNT ASSEMBLY

RELATED APPLICATIONS

This application is a continuation of and claims priority to U.S. Non-provisional patent application Ser. No. 15/224,408, filed on Jul. 29, 2016, and titled "Handlebar Mount Assembly," which claims priority to U.S. Provisional Application No. 62/295,595, filed on Feb. 16, 2016, and titled, "Handlebar Mount," the entire contents of which are incorporated herein by reference.

FIELD OF INVENTION

The present invention relates to an assembly for attaching a handlebar to the steering mechanism of a cycle, and more particularly, to a handlebar mount for damping the transmission of vibrations from a cycle steering mechanism to a cycle handlebar.

BACKGROUND OF INVENTION

Devices for reducing the transmission of vibrations from a cycle through the cycle's handlebars to a rider are known in the art. For example, U.S. Pat. No. 8,317,214 discloses a shock and vibration damping mounting assembly for vehicles that utilizes handlebar assisted steering, where the handlebar and its clamping components are suspended by shock and vibration damping springs and materials. The suspended components are allowed to travel along a guide, in a predetermined path, while maintaining the rider preferred handlebar angles, as the vehicle encounters shock due to rough terrain. Springs damp the motion of the suspended components reducing the effects of the rough terrain to the rider's hands. The suspended components are isolated from the vehicle's steering mechanism by isolation components made of deadening materials thus reducing the transfer of vibration from the vehicle to the rider's hands.

U.S. Pat. No. 9,061,728 discloses a bicycle handlebar grip including a body having at least two grip areas positioned for interaction with the hands of a rider. The grip portions or grip areas are spaced apart by a center portion that secures the assembly to a bicycle steerer tube. A channel or detent is formed in the body proximate at least one, and preferably proximate each grip portion or grip area. A dampener formed of a different material than the body is disposed in the detent and dissipates at least a portion of vibration of the body to reduce vibrations communicated to the hands of the rider from handlebar vibration.

U.S. Pat. No. 8,756,766 discloses a vibration dampening handle for a powered apparatus including an elongated gripping member having first and second opposite ends and a longitudinal axis extending through the first and second ends, and a wall defining an inner bore and having an inner surface. The inner bore extending along the longitudinal axis at least partially through the gripping member, and opens on at least the first end of the gripping member. A weighted mass is disposed at the second free cantilevered end of the gripping member. An elongate elastic beam member is attached to the gripping member. A portion of the beam member is disposed within the inner bore and is spaced apart from the inner surface. The beam member further includes a first end that extends beyond the first end of the gripping member and includes a fastening member adapted to connect the handle to the powered apparatus.

SUMMARY OF INVENTION

The handlebar mount assembly of the present invention allows the handlebars of cycles such as motorcycles, dirt bikes, street bikes, bicycles, mountain bikes, road bikes, ATV's and the like to float within a polymer sleeve of varying thickness and stiffness to mitigate or eliminate the transmission of vibrations, which are common with these cycles, to a rider through the handlebars. The handlebar mount assembly also allows the handlebars to respond accordingly with the stiffness and thickness of the polymer sleeve to imperfections in the road or trail surface, e.g., rough ground. By wrapping the handlebars with the polymer sleeve, a suspension effect is created for the handlebars, effectively producing a smoother riding experience for the operator than possible with current cycles. The use of a pinch or tension clamp on the bars, by running the upper shafts of the pinch clamp through the upper handlebar clamp and the sliding the clamp bushing down through the upper handlebar clamp before tightening the pinch bolts, effectively holds the handlebar in the desired position but also prevents any metal-to-metal contact between the handlebar and the rest of the motorcycle. This creates a soft medium between the rider/operator and the cycle, making for a more pleasant ride.

According to one aspect of the invention there is provided a cycle handlebar mount including a top bracket assembly, a bottom bracket assembly and a cycle handlebar about which an elastomeric first sleeve, an elastomeric second sleeve and a tension clamp assembly are disposed, the cycle handlebar being operatively coupled between the top bracket assembly and the bottom bracket assembly. An elastomeric bushing is located between the tension clamp and the top bracket assembly to allow for indirect engagement of the tension clamp with the top bracket assembly. Arranged in this manner, the first sleeve and the second sleeve are compressed between the top bracket assembly and the bottom bracket assembly, the bushing is compressed between the tension clamp assembly and the top bracket assembly and the cycle handlebar and the tension clamp assembly remain spaced apart from the top bracket assembly and the bottom bracket assembly.

In one embodiment, the tension clamp assembly includes a top clamp portion, a bottom clamp portion and one or more clamp fasteners coupling the top clamp portion to the bottom clamp portion, at least one of the one or more clamp fasteners having a head portion extending within a void defined by a periphery of an opening extending through an upper wall of the top bracket assembly. According to this embodiment, the bushing is disposed and compressed between the head portion and the periphery of the opening.

In another embodiment, the tension clamp assembly includes a top clamp portion, a bottom clamp portion and an integral, vertically extending clamp arm extending from a top surface of the top clamp portion into a void defined at least in part by an indentation or depression within an inner surface of a top wall of the top bracket assembly. According to this embodiment, the bushing is disposed about the clamp arm and between the clamp arm and the inner surface of the top wall.

According to another aspect of the invention there is provided a method of installing a cycle handlebar to a cycle steering mechanism. The method includes attaching a bottom bracket to the cycle steering mechanism, disposing an elastomeric first sleeve and an elastomeric second sleeve about the cycle handlebar and clamping a tension clamp assembly about the cycle handlebar and between the first sleeve and the second sleeve. The handlebar is then placed in the bottom bracket with the first sleeve and the second sleeve being in contact with the bottom bracket and the cycle handlebar and the tension clamp assembly being spaced apart from the bottom bracket. A top bracket is coupled to the bottom bracket with the first sleeve and the second sleeve being compressed between the bottom bracket and the top bracket and the cycle handlebar and the tension clamp assembly being spaced apart from the top bracket. To allow interaction of the tension clamp with the top bracket assembly, a bushing is placed between the tension clamp assembly and the top bracket.

According to yet another aspect of the invention there is provided a cycle handlebar mounting kit including a i) tension clamp including a top clamp portion and a bottom clamp portion, the top clamp portion and the bottom clamp portion being configured for receiving and clamping a cycle handlebar therebetween, ii) a first bottom bracket including a base portion, a substantially U-shaped portion having a front flange portion and rear flange portion and a central opening extending through the base portion and the substantially U-shaped portion, the first bottom bracket being configured for attachment to a motorcycle steering mechanism, iii) a top bracket having a substantially U-shaped portion, a rear flange portion, a front first flange portion, a front second flange portion and an open front slot located between the first and second flange portion, iv) an elastomeric first sleeve configured for disposal around a cycle handlebar, v) an elastomeric second sleeve configured for disposal around the cycle handlebar, and vi) a bushing.

In one embodiment of the kit, the kit further includes one or more clamp fasteners configured for coupling the top clamp portion to the bottom clamp portion, at least one of the one or more clamp fasteners having a head portion configured for extending within a void defined by a periphery of an opening extending through an upper wall of the top bracket. In this embodiment, the bushing is configured for placement about the head portion and between the head portion and the upper wall.

In another embodiment of the kit, the top clamp portion includes an integral, vertically extending clamp arm configured for extending from a top surface of the top clamp portion into a void defined at least in part by an upper wall of the top bracket assembly. In this embodiment, the bushing is configured for placement about the clamp arm and between the clamp arm and the upper wall, specifically, the sidewalls of the upper wall defining the void.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 32 is an exploded perspective view of the handlebar mount of FIG. 15.

DETAILED DESCRIPTION OF THE DRAWINGS

FIGS. 1 through 14 depict a cycle handlebar mount 10 in accordance with a first embodiment of the present invention. FIGS. 15 through 32 depict a cycle handlebar mount 100 in accordance with a second embodiment of the present invention. Mounts 10 and 100 are utilized to couple a handlebar 11 to a motorcycle steering mechanism 13 while damping the transmission of vibrations from the cycle steering mechanism to the cycle handlebar. Before the present articles, devices, and/or methods are disclosed and described in detail, it is to be understood that they are not limited to specific methods unless otherwise specified, and as such may vary. It is also to be understood that the terminology as used herein is used only for the purpose of describing particular embodiments and is not intended to be limiting.

Figure 1:
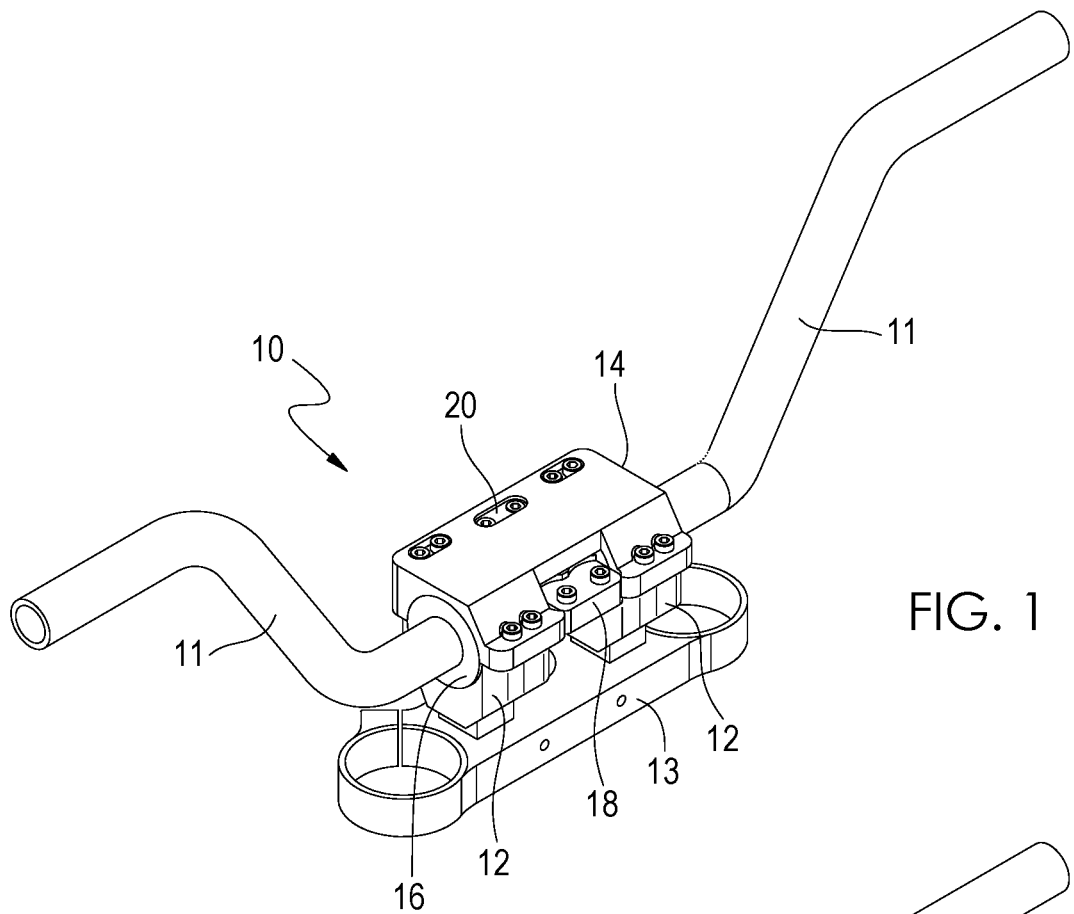
FIG. 1 is a front perspective view of a handlebar mount in accordance with a first embodiment of the present invention.
Figure 2:
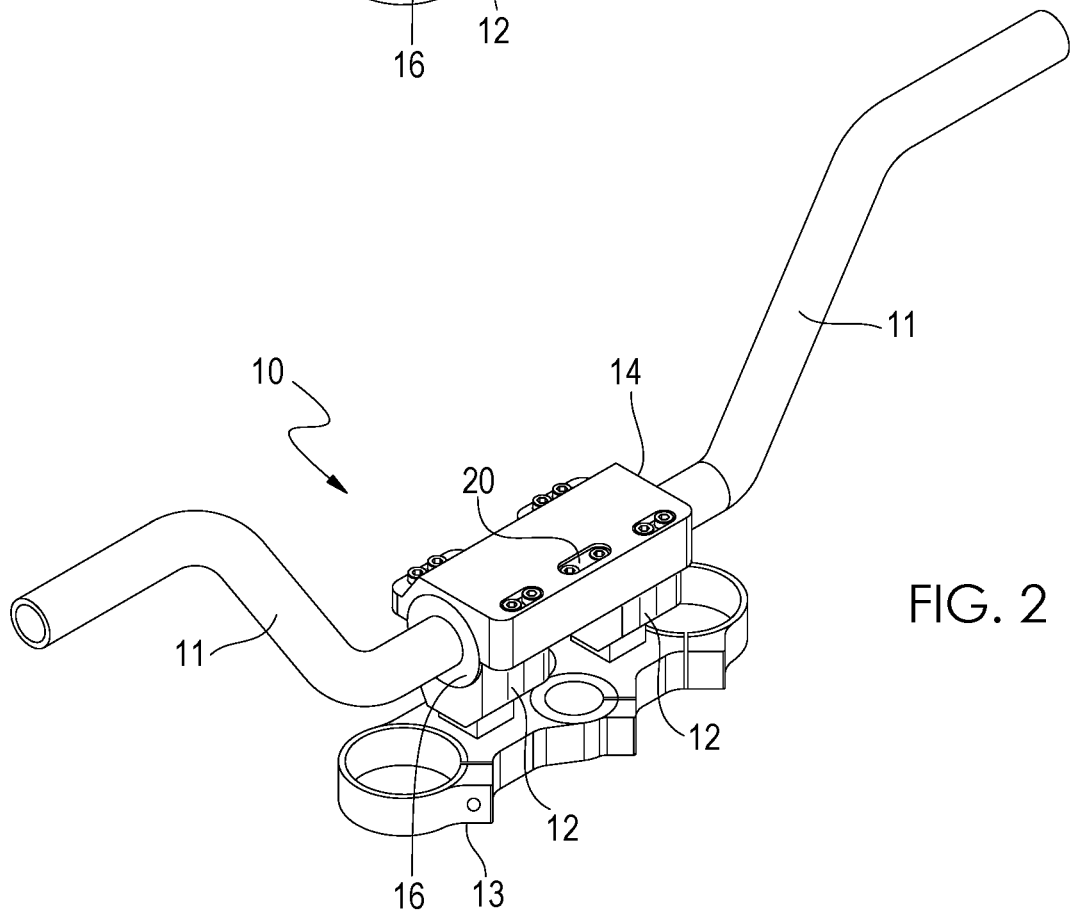
FIG. 2 is rear perspective view of the handlebar mount of FIG. 1.
Figure 3:
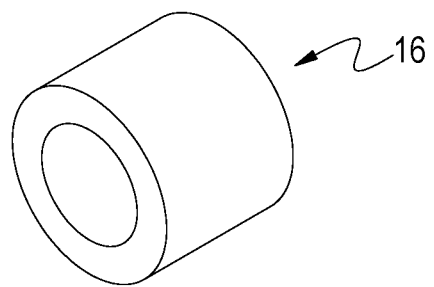
FIG. 3 is a perspective view of a handlebar sleeve of the handlebar mount of FIG. 1.

As illustrated in FIGS. 1 and 2, mount 10 generally includes bottom brackets 12, a top bracket 14, a pair of sleeves 16, a tension clamp 18 and a clamp bushing 20. Referring to FIG. 3, each of sleeves 16 forms a cylinder and is fabricated from an elastomeric polymer. Suitable polymers from which sleeves 16 can be fabricated include asphaltics, polyurethanes, poly(vinyl acetate) and copolymers, acrylics, natural rubber and styrene-butadiene rubber and silicone rubber. Sleeves 16 are configured for wrapping directly around handlebar 11. The hardness of the sleeves and clamp bushing may vary depending on the desired stiffness of the coupling of the handlebar to the cycle.

Figure 4:
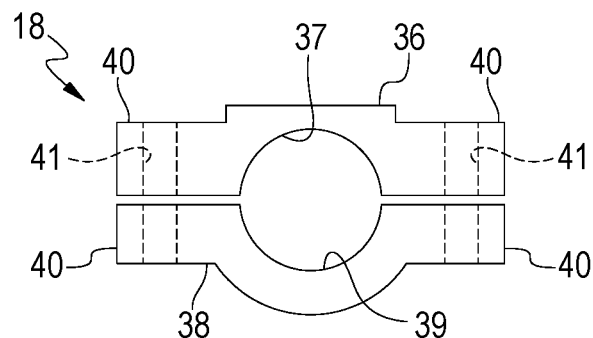
FIG. 4 is an elevational view of a side of a tension clamp of the handlebar mount of FIG. 1.
Figure 5:
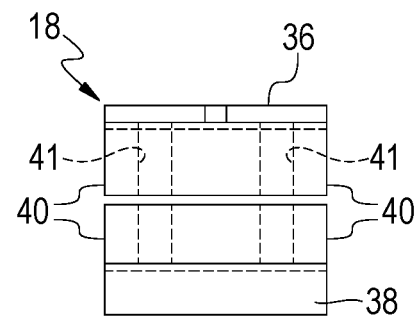
FIG. 5 is an elevational view of an end of the tension clamp of FIG. 4.
Figure 6:
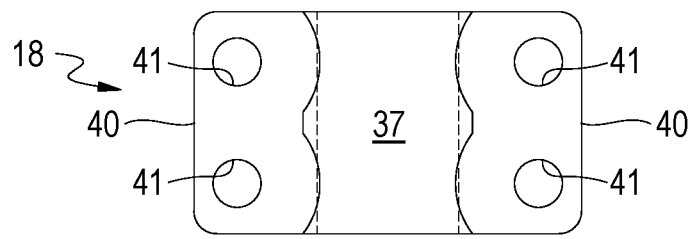
FIG. 6 is a plan view of an inner surface of an upper portion of the tension clamp of FIG. 4.

Referring to FIGS. 4 through 6, tension clamp 18 includes an upper portion 36 having an inner, half-cylinder surface 37 and a lower portion 38 having an inner, half cylinder surface 39. Each of upper portion 36 and lower portion 38 has opposing wing portions 40 with two adjacent, threaded bolts holes 41 for receiving threaded bolts. Portions 36, 38 are configured for receiving and clamping handlebar 11 within respective inner, half-cylinder surfaces 37, 39. By clamping it is meant that portions 36 and 38 hold or secure the handlebar tightly therebetween to prevent movement of the handlebar through the application of inward pressure against the handlebar, which is selectively increased or decreased by tightening or loosening the bolts, as required.

Figure 7:
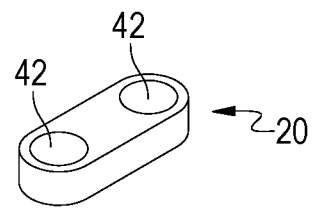
FIG. 7 is a perspective view of a clamp bushing of the handlebar mount of FIG. 1.

Referring to FIG. 7, clamp bushing 20 includes an elongate polymer member, with rounded corners, having pair of adjacent openings 42 therethrough. Openings 42 are configured for receiving and completely surrounding the heads of the pair of bolts used to clamp tension clamp 18 to handlebar 11. Clamp bushing 20 is fabricated from an elastomeric polymer. Suitable polymers from which clamp bushing 20 can be fabricated include asphaltics, polyurethanes, poly(vinyl acetate) and copolymers, acrylics, natural rubber and styrene-butadiene rubber and silicone rubber.

Figure 8:
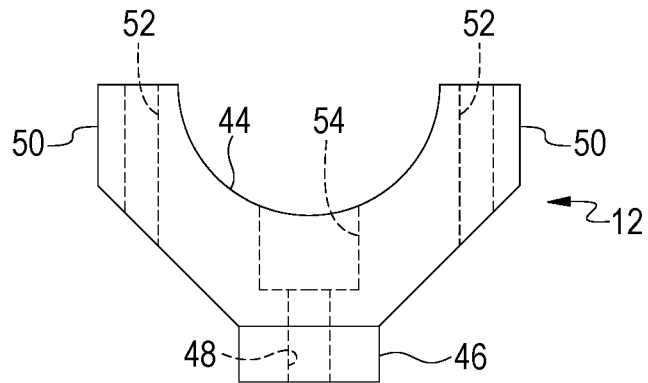
FIG. 8 is an elevational view of a side of a bottom bracket of the handlebar mount of FIG. 1.
Figure 9:
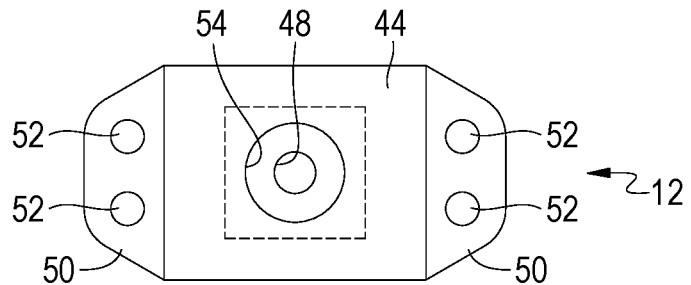
FIG. 9 is a top plan view of the bottom bracket of FIG. 8.
Figure 10:
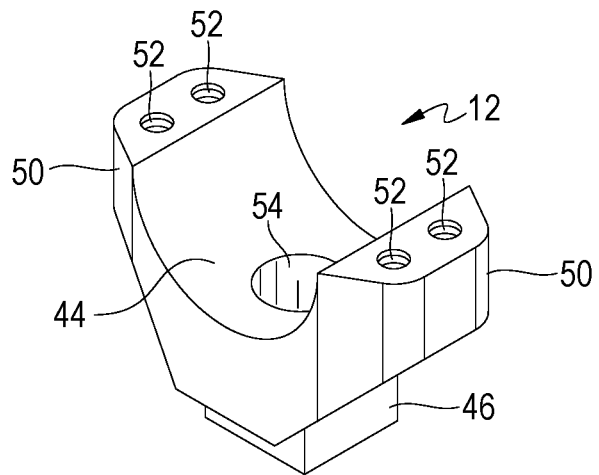
FIG. 10 is a perspective view of the bottom bracket of FIG. 8.

Referring to FIGS. 8 through 10, each of bottom brackets 12 has a substantially Y-shaped cross-section, a half-cylinder, inner surface 44, a stem portion 46, a bolt hole 48 extending through stem portion 46 and through inner surface 44, and opposing arms 50 through which a pair of adjacent bolt holes 52 extend. A bolt head space 54 is provided within bolt hole 48 for entirely receiving the head of a bolt. Stem portion 46 and bolt hole 48 are configured for attaching bottom bracket 12 to motorcycle steering mechanism 13. A pair of bottom brackets 12 is attached to motorcycle steering mechanism 13 with a bracket 12 located on either side of tension clamp 18.

Figure 11:
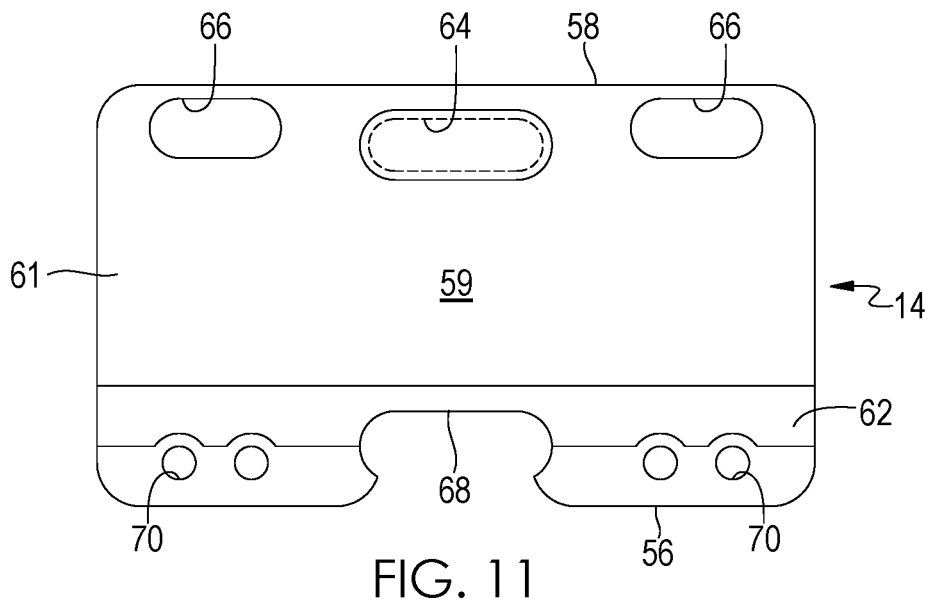
FIG. 11 is a top plan view of a top bracket of the handlebar mount of FIG. 1.
Figure 12:
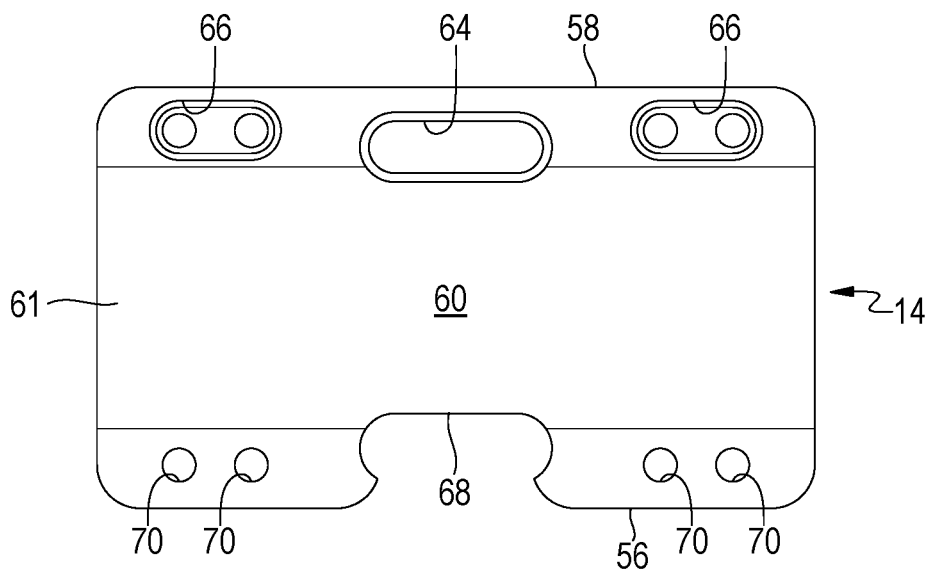
FIG. 12 is a bottom plan view of the top bracket of FIG. 11.
Figure 13:
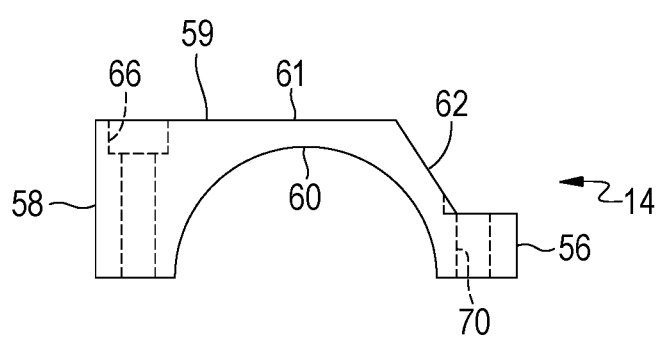
FIG. 13 is an elevational view of a side of the top bracket of FIG. 11.

Referring to FIGS. 11 through 13, top bracket 14 includes a front face 56, a rear face 58, a top face 59 and a half-cylinder, bottom face 60. Top face 59 has a flat portion 61 extending from rear face 58 and an angled portion 62 which extends downwardly from flat portion 61 towards front face 56. Extending from bottom face 60 through a central portion of the flat portion of top face 59 and adjacent to rear face 58 is an elongate opening 64. Adjacent to each end of elongate opening 64 is a bolt hole 66 arranged to receive two bolts. Formed within front face 56 is an elongate open slot or indentation 68. Located adjacent to each end of indentation 68 is a pair of bolts holes 70. Top bracket 14 is configured for attaching to the pair of bottom brackets 12 and thereby clamping handlebar 11 between the bottom brackets and the upper bracket.

Figure 14:
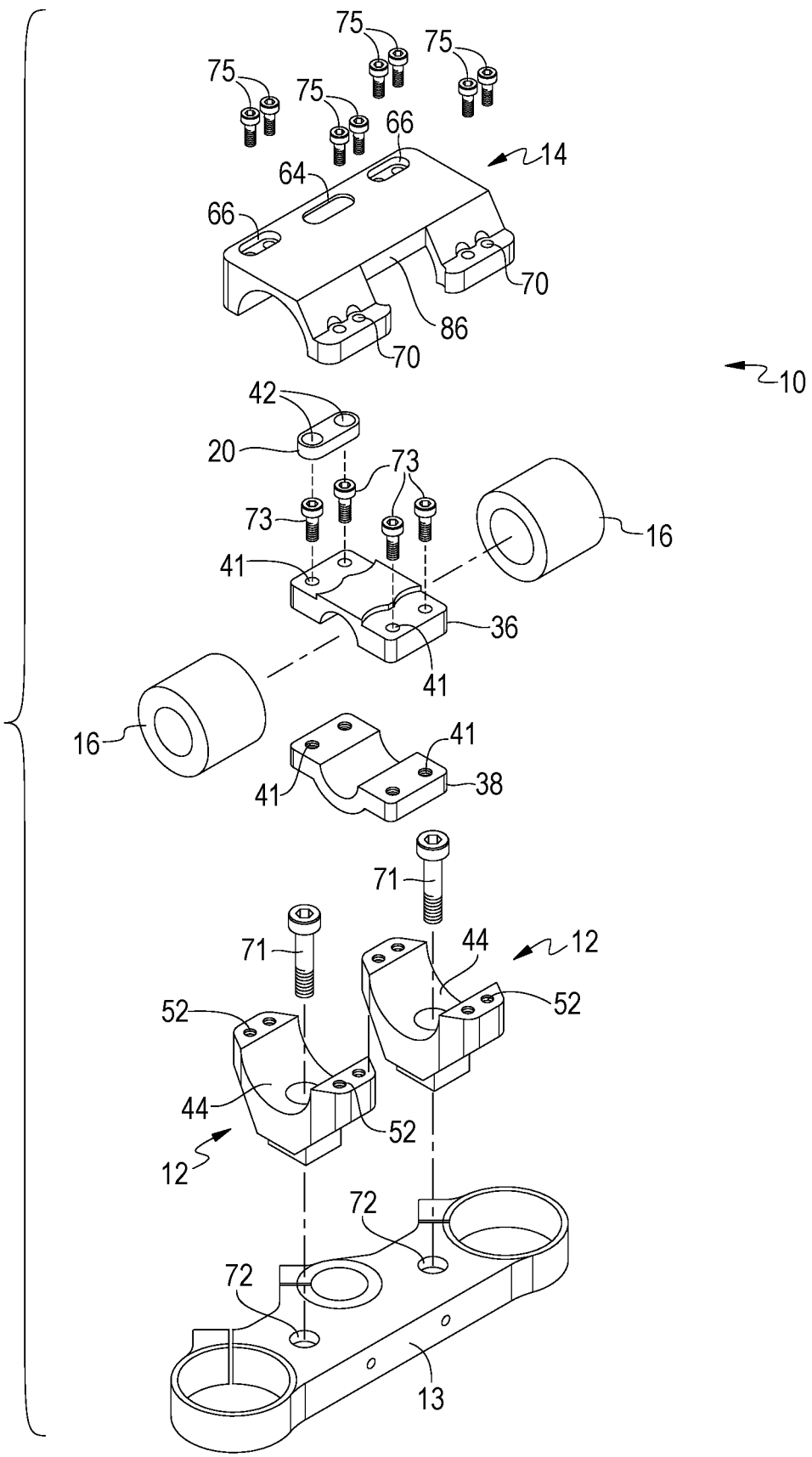
FIG. 14 is an exploded perspective view of the handlebar mount of FIG. 1.

Referring to FIG. 14, bottom brackets 12 are attached to motorcycle steering mechanism 13 by inserting threaded bolts 71 through threaded bolt hole 48 of each bottom bracket 12 and complementary bolts holes 72 in steering mechanism 13. Referring to FIGS. 1 and 14, tension clamp 18 is attached to a center of handlebar 11 by placing the handle bar between the inner, half-cylinder surfaces 37, 39 of upper and lower portions 36, 38, aligning the threaded bolt holes 40 of the wing portions 36 of the upper portion 36 with the lower portion 38 and threading bolts 73 through passageways 41. With tension clamp 18 in place, each end of handlebar 11 is inserted through a sleeve 16, and each sleeve 16 is slid along handlebar 11 until resting adjacent to tension clamp 18.

With sleeves 16 and tension clamp 18 securely attached to handlebar 11, handlebar 11 is placed over steering mechanism 13 and sleeves 16 aligned with bottom brackets 12. Handlebar 11 is then lowered so that sleeves 16 are received within the inner surfaces 44 of bottom brackets 12.

With handlebar 11 seated within bottom brackets 12, top bracket 14 is positioned over handle bar 11 and bottom brackets 12 and threaded bolts 75 are inserted through bolt holes 66 and 70. The threaded bolts 75 are aligned with complimentary threaded bolt holes 52 in bottom bracket 12, elongate opening 64 is aligned with one of the pair of adjacent bolt heads of the bolts 73 used to attach the upper and lower portions 36, 38 of tension clamp 18 and indentation 86 is aligned with the other pair of adjacent bolt heads of the bolts 73 used to attach the upper and lower portions 36, 38 of tension clamp 18. With the foregoing portions aligned, top bracket 14 is lowered with sleeves 16 being sandwiched between the inner half-cylinder surfaces 44 of the bottom brackets 12 and half cylinder surface 60 of the top bracket 14. With handlebar 11 secured between top bracket 14 and bottom bracket 12, clamp bushing 20 is positioned above elongate opening 64 with openings 42 aligned with the bolts heads of bolts 73 located within elongate opening 64. Clamp bushing 20 is then lowered and placed over the bolt heads so that the bolts heads are located within opening 42 of clamp bushing 20. Clamp bushing is used to prevent direct contact of the bolt heads to top bracket 14, while allowing indirect interaction between the bolt heads and tension clamp 18 with top bracket 14.

Mount 10, assembled as described above, serves to isolate handlebar 11 from steering mechanism 13 by preventing a completely rigid coupling of handlebar 11 to the steering mechanism. Instead, rigid couplings are replaced with flexible coupling by virtue of sleeves 16 and clamp bushing 20. Sleeves 16 prevent direct contact between the top bracket and the bottom bracket\, and the bushing prevents direct contact between the tension clamp and the top bracket. In this manner, the handlebar mount assembly prevents direct and indirect contact of the steering mechanism to the handlebar through the metal components of the handlebar mount assembly.

Figure 15:
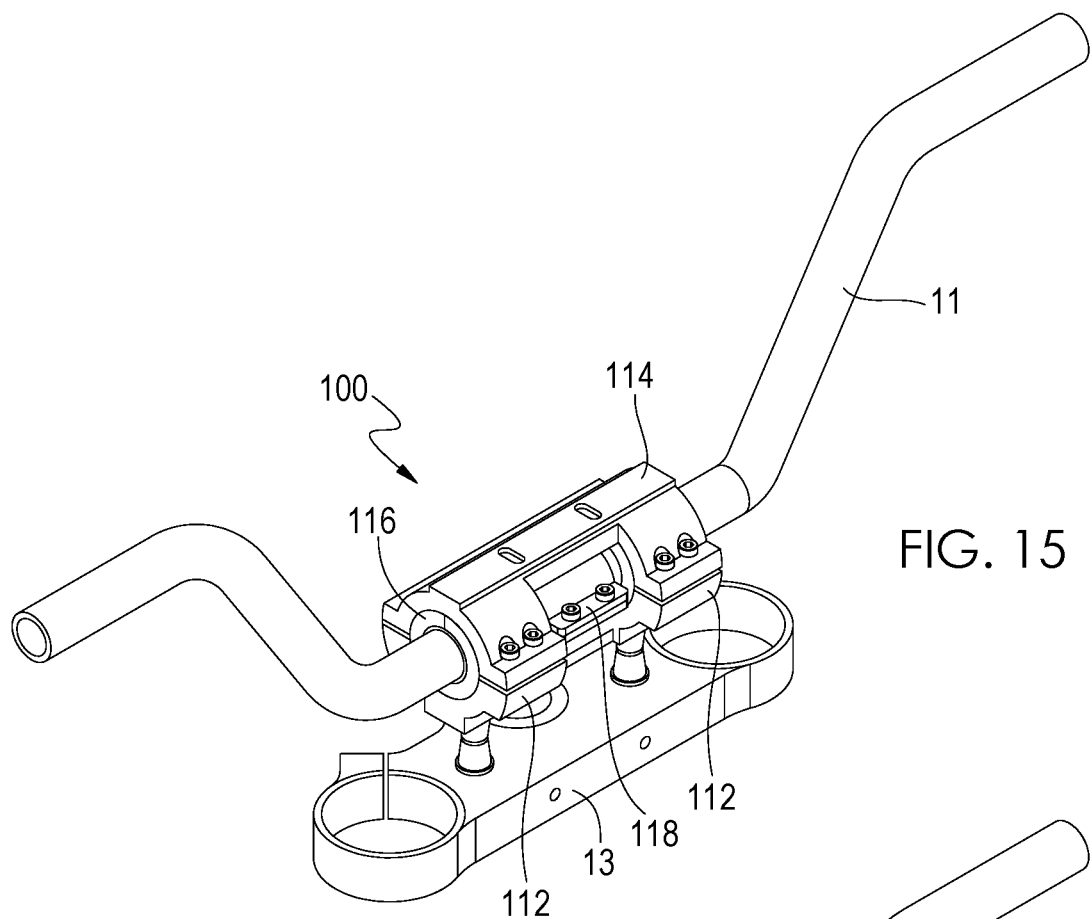
FIG. 15 is a front perspective view of a handlebar mount in accordance with a second embodiment of the present invention.
Figure 16:
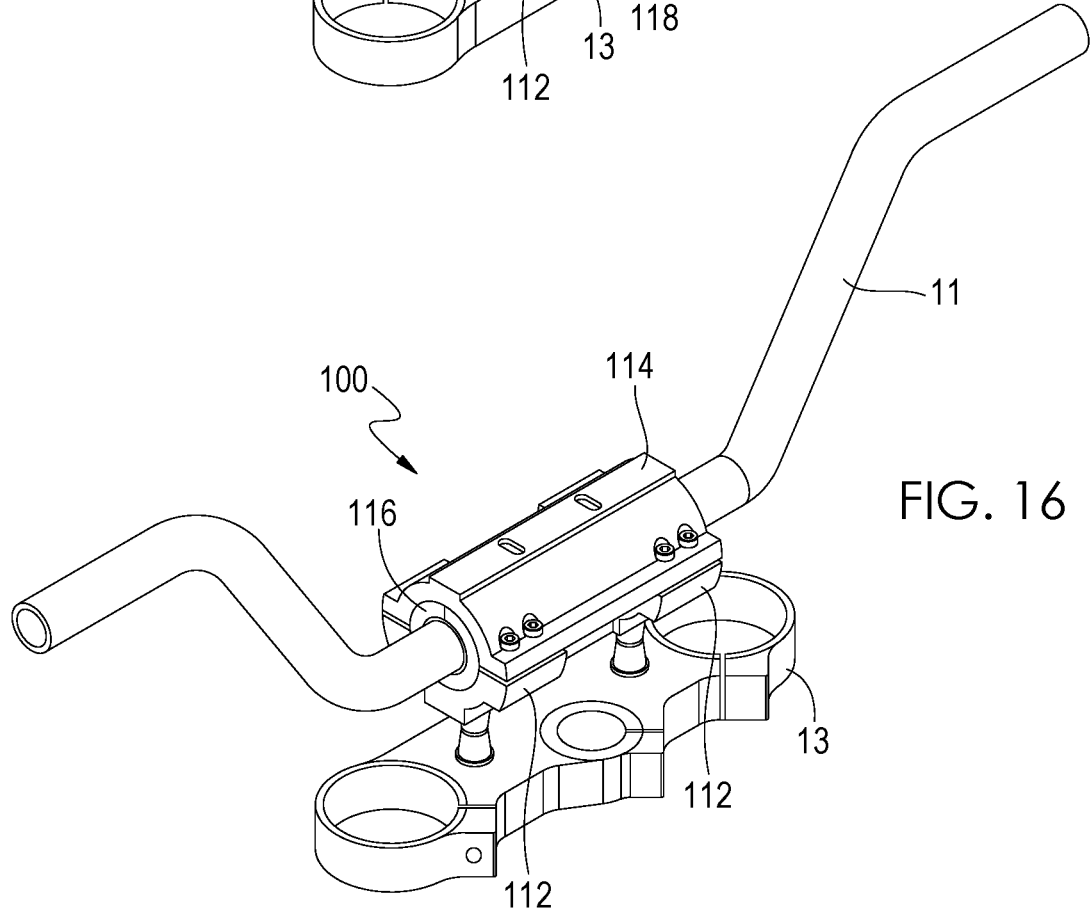
FIG. 16 is rear perspective view of the handlebar mount of FIG. 15.
Figure 17:
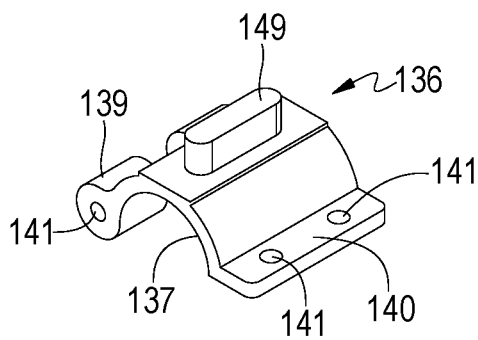
FIG. 17 is a front perspective view of a top clamp member of a hinged clamp of the handlebar mount of FIG. 15.
Figure 18:
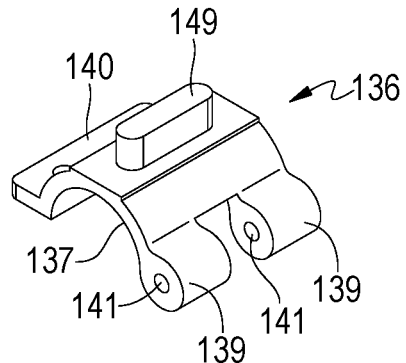
FIG. 18 is a rear perspective view of the top clamp member of FIG. 17.
Figure 19:
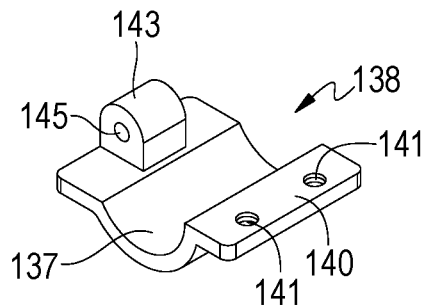
FIG. 19 is a front perspective view of a bottom clamp member of the hinged clamp of the handlebar mount of FIG. 15.
Figure 20:
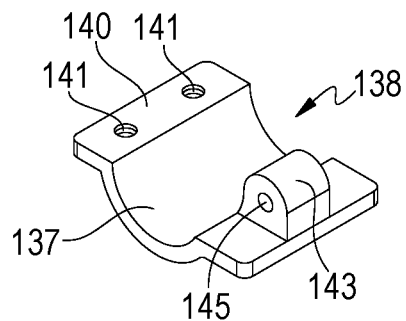
FIG. 20 is a rear perspective view of the bottom clamp member of FIG. 19.
Figure 21:
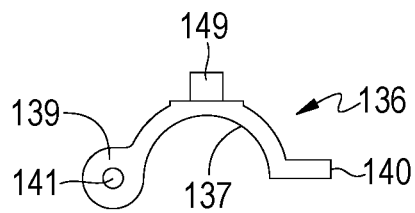
FIG. 21 is an elevational view of a side of the top clamp member of FIG. 17.
Figure 22:
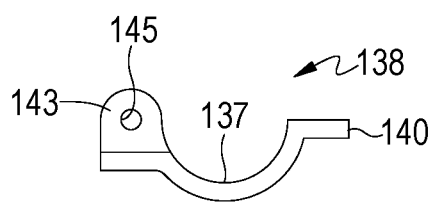
FIG. 22 is an elevational view of a side of the bottom clamp member of FIG. 19.
Figure 23:
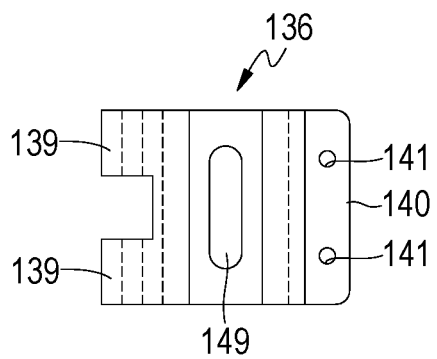
FIG. 23 is a top plan view of the top clamp member of FIG. 17.
Figure 24:
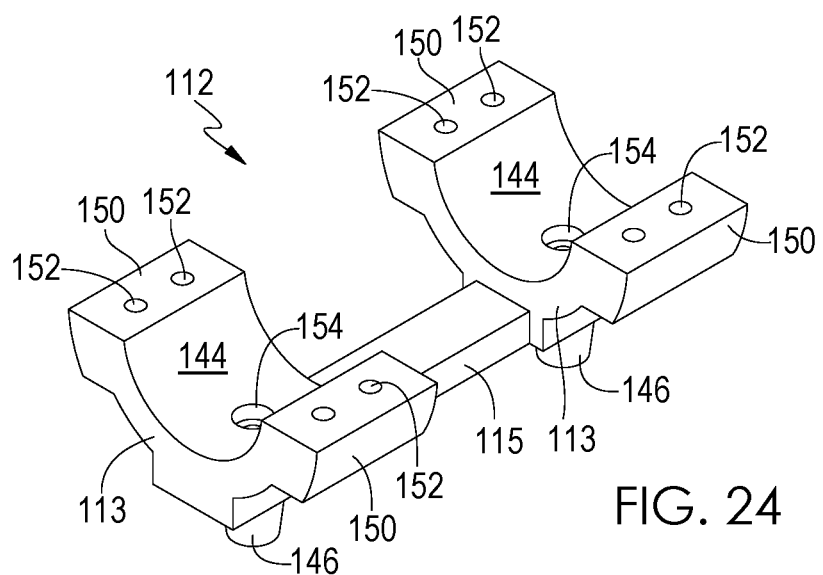
FIG. 24 is a perspective view of a bottom bracket of the handlebar mount of FIG. 15.
Figure 25:
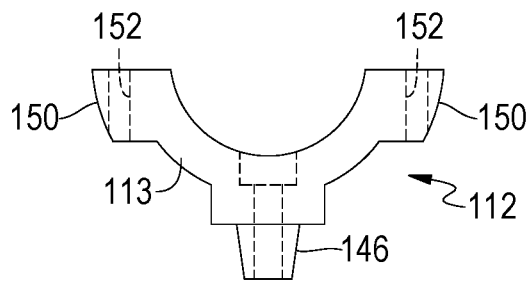
FIG. 25 is an elevational view of a side of the bottom bracket of FIG. 24.
Figure 26:
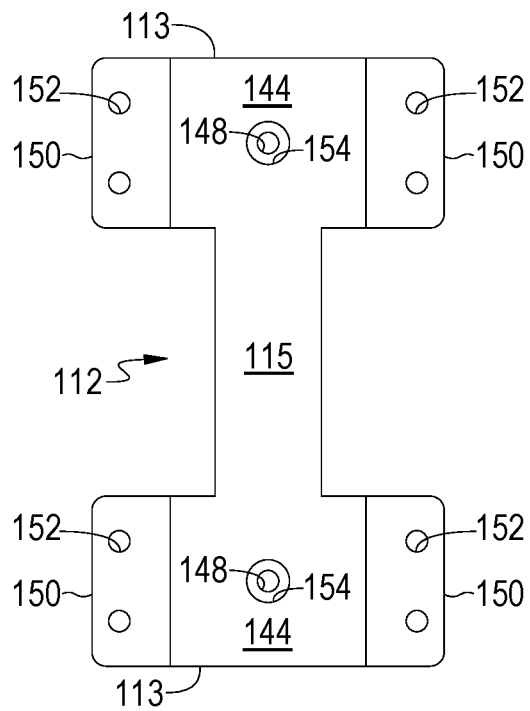
FIG. 26 is a top plan view of the bottom bracket of FIG. 24.
Figure 27:
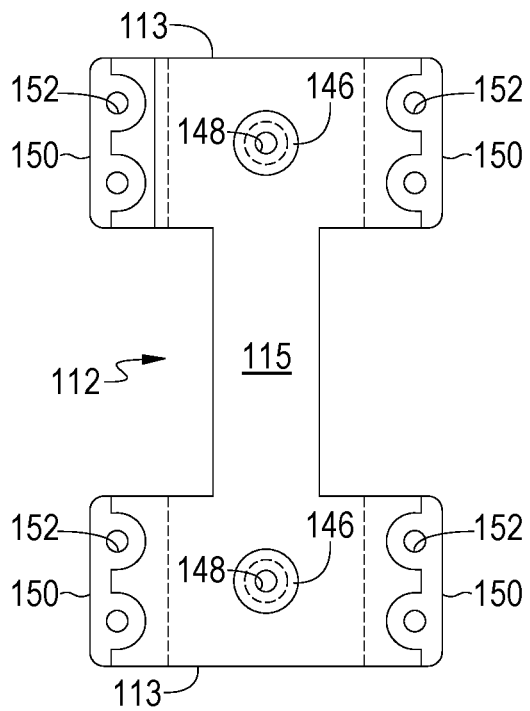
FIG. 27 is a bottom plan view of the bottom bracket of FIG. 24.
Figure 28:
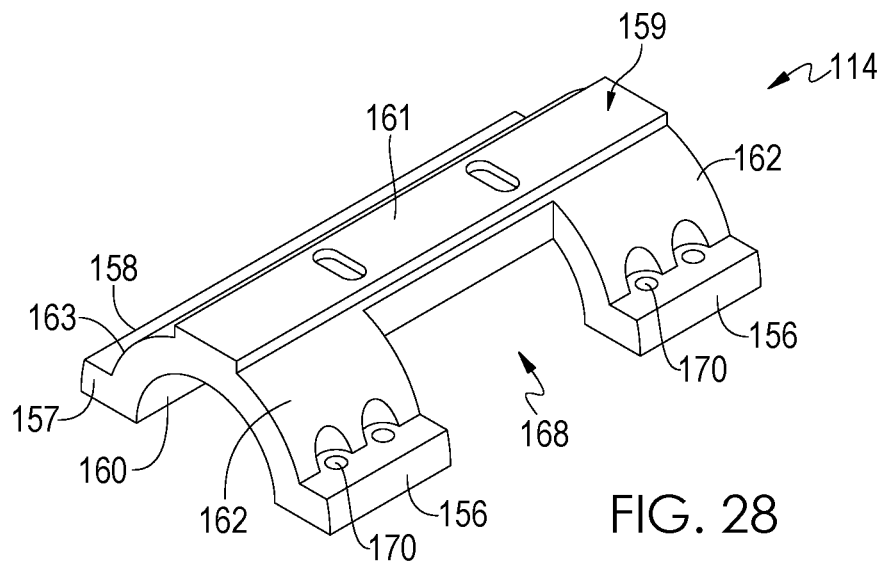
FIG. 28 is a front perspective view of a top bracket of the handlebar mount of FIG. 15
Figure 29:
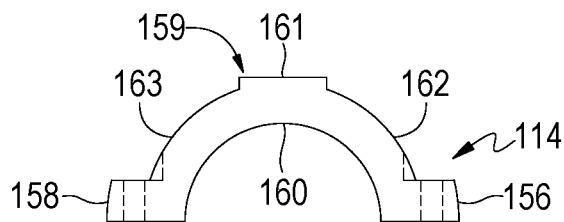
FIG. 29 is an elevational view of a side of the top bracket of FIG. 28.
Figure 30:
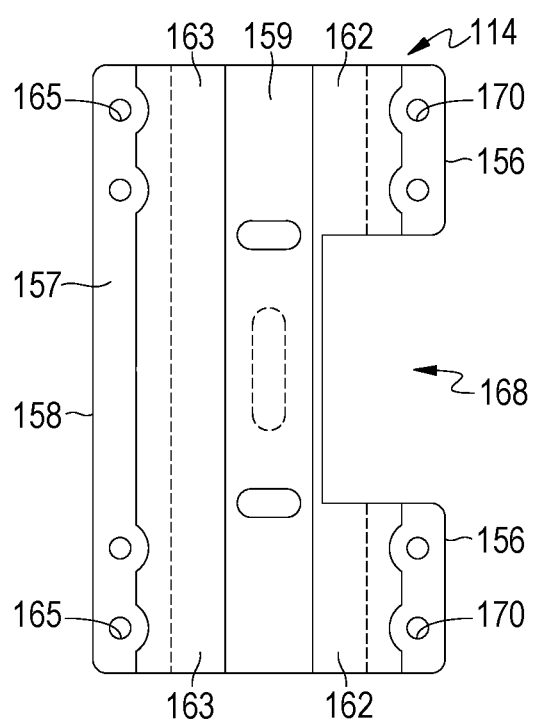
FIG. 30 is a top plan view of the top bracket of FIG. 28.

FIGS. 15 through 32 depict cycle handlebar mount 100. As illustrated in FIGS. 15, 16 and 32, mount 100 generally includes a one-piece bottom bracket 112, a top bracket 114, a pair of sleeves 116, a hinged tension clamp 118 and a clamp bushing 120. Each of sleeves 116 forms a cylinder and is fabricated from an elastomeric polymer such as asphaltics, polyurethanes, poly(vinyl acetate) and copolymers, acrylics, natural rubber and styrene-butadiene rubber and silicone rubber. Sleeves 116 are configured for wrapping directly around handlebar 11.

Referring to FIGS. 17 through 22, hinged tension clamp 118 includes an upper portion 136 having an inner, half-cylinder surface 137 and a lower portion 138 having an inner, half cylinder surface 137. Each of upper portion 136 and lower portion 138 has a wing portion 140 having two adjacent, threaded bolts holes 141 for receiving threaded bolts. Opposite each wing portion 140 is a hinge mechanism for hingedly coupling upper portion 136 with lower portion 138. In particular, upper portion 136 includes a pair of spaced-apart cylinders 139 having aligned passageways 141. The space between cylinders 139 is configured to receive a pivot member 143 of lower portion 138 having a passageway 145 therethrough that aligns with passageways 141. A pin 147 is inserted through passageways 141 and passageway 145 thereby hingedly coupling upper and lower portions 136, 138. Protruding upwardly from a central portion of the top surface of the upper portion 136 is a clamp arm 149. Portions 136, 138 are configured for receiving and clamping handlebar 11 within the respective inner, half-cylinder surfaces 137.

Referring to FIG. 32, clamp bushing 120 includes an elongate polymer member, with rounded corners, having an opening 142 therethrough. Opening 142 is configured for receiving and completely surrounding clamp arm 149 of clamp tension clamp 118 to handlebar 11. Clamp bushing 120 is fabricated from a polymer such asphaltics, polyurethanes, poly(vinyl acetate) and copolymers, acrylics, natural rubber and styrene-butadiene rubber and silicone rubber.

Referring to FIGS. 24 through 27, bottom bracket 112 includes a pair of bracket members 113 connected by a bridge member 115, each of members having a substantially Y-shaped cross-section, a half-cylinder, inner surface 144, a stem portion 146, a bolt hole 148 extending through stem portion 146 and through inner surface 144, and opposing arms 150 through which a pair of adjacent bolt holes 152 extend. A bolt head space 154 is provided within bolt hole 148 for receiving the head of a bolt. Stem portion 146 and bolt hole 148 are configured for attaching bottom bracket 112 to motorcycle steering mechanism 13. A bracket member 113 of bottom brackets 112 is attached to motorcycle steering mechanism 13 on either side of hinged tension clamp 118.

Referring to FIGS. 28 through 31, top bracket 114 includes a front face 156, a rear face 158, a top face 159 and a half-cylinder, bottom face 160. Top face 159 has an uppermost flat portion 161 from which curved surfaces 162 and 163 extend toward front face 156 and rear face 158, respectively. Curved surface 163 terminates in an elongate footing 157 having two pairs of bolt holes 165 located at opposing ends of footing 157. Formed within bottom face 160 is an elongate indention 164. Formed within front face 156 is a rectangular-shaped, elongate indentation 168. Located adjacent to each end of indentation 168 is a pair of bolts holes 170. Top bracket 114 is configured for attaching to bottom bracket 112 and thereby clamping handlebar 11 between the bottom bracket and the upper bracket.

Figure 31:
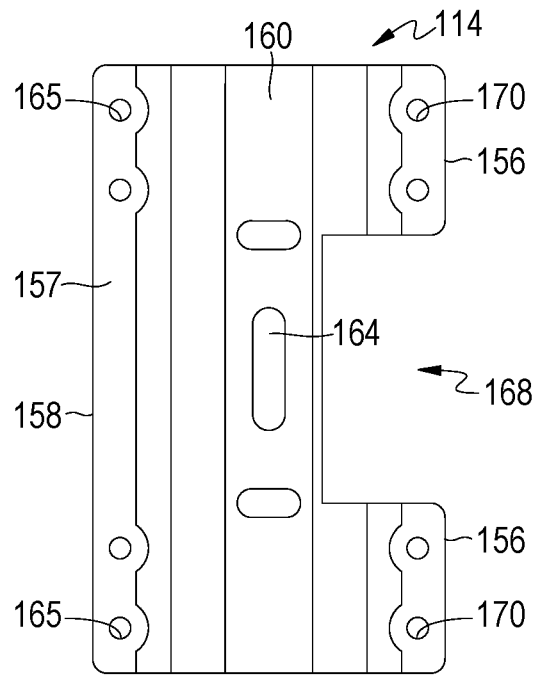
FIG. 31 is a bottom plan view of the top bracket of FIG. 28.

Referring to FIG. 32, bottom bracket 112 is attached to motorcycle steering mechanism 13 by inserting threaded bolts 171 through threaded bolt hole 148 of bottom bracket and complementary bolts holes 172 in the steering mechanism. Extension sleeves 175 can be used if it is desired to increase the distance between handlebar 11 and steering mechanism 13. Referring to FIGS. 15 and 31, tension clamp 118 is attached to a center of handlebar 11 by hingedly coupling upper and lower portions 136, 136 together by aligning passageways 141 with passageway 145 and inserting pin 147 therethrough. Thereafter, the handle bar is placed between the inner, half-cylinder surfaces 137 of upper and lower portions 136, 138, the threaded bolt holes of the wing portions 140 of the upper portion 136 are aligned with the lower portion 138 and bolts 173 are threaded through passageways 41. With tension clamp 18 in place, each end of handlebar 11 is inserted through a sleeve 116, and each sleeve 116 is slid along handlebar 11 until resting adjacent to tension clamp 118.

With sleeves 116 and tension clamp 118 securely attached to handlebar 11, handlebar 11 is placed over steering mechanism 13 and sleeves 116 aligned with respective bracket members 113 of bottom brackets 112. Handlebar 11 is then lowered so that a sleeve 116 is received within the inner surface 144 of each bracket member 113 of bottom brackets 112.

With handlebar 11 seated within bottom bracket 112, bushing 120 is placed about clamp arm 149 and top bracket 114 is positioned over handle bar 11 and bottom bracket 112 and threaded bolts 175 are inserted through bolt holes 165 and 170. The threaded bolts 175 are aligned with complimentary threaded bolt holes 152 in bottom bracket 112, elongate indentation 164 is aligned with bushing 120 and clamp arm 149 of tension clamp 118 and indentation 186 is aligned with the bolt heads of the bolts 173 used to attach the upper and lower portions 136, 138 of tension clamp 118. With the foregoing portions aligned, top bracket 114 is lowered with sleeves 116 being sandwiched between the inner half-cylinder surfaces 144 of the bottom brackets 112 and half cylinder surface 160 of the top bracket 114. With top and bottom brackets 114, 112 fully engaged, clamp arm 149, including the upper end thereof, is spaced apart from top bracket 114 so that a space is formed therebetween. Clamp bushing 120 is located within the space and compressed by and between clamp arm 149 with the sidewalls top bracket 144 which define indentation 186.

Mount 100, assembled as described above, serves to isolate handlebar 11 from steering mechanism 13 by preventing a completely rigid coupling of handlebar 11 to the steering mechanism. Instead, rigid couplings are replaced with flexible coupling by virtue of sleeves 116 and clamp bushing 120.

What is claimed is:

1. A cycle handlebar mount comprising:
   an elastomeric first sleeve and an elastomeric second sleeve operatively coupled to a cycle handlebar,
   a bracket assembly operatively coupled to the first sleeve and the second sleeve and spaced apart from the cycle handlebar,
   a tension clamp assembly coupled to the cycle handlebar, between the first sleeve and the second sleeve, and spaced apart from the bracket assembly, and
   a bushing compressed between the tension clamp assembly and the bracket assembly,
   wherein the bushing is disposed around a clamp arm extending from the tension clamp assembly into a void that is formed within an inner surface of the bracket assembly.

2. The cycle handlebar mount of claim 1 wherein the first sleeve and the second sleeve are compressed between a top bracket portion of the bracket assembly and a bottom bracket portion of the bracket assembly.

3. The cycle handlebar mount of claim 2 wherein the bottom bracket portion includes two separate, spaced apart bracket pieces.

4. A cycle handlebar mount comprising:
   an elastomeric first sleeve and an elastomeric second sleeve operatively coupled to a cycle handlebar,
   a bracket assembly operatively coupled to the first sleeve and the second sleeve and spaced apart from the cycle handlebar,
   a tension clamp assembly coupled to the cycle handlebar, between the first sleeve and the second sleeve, and spaced apart from the bracket assembly, and a bushing compressed between the tension clamp assembly and the bracket assembly,
wherein the tension clamp assembly includes one or more clamp fasteners for coupling the clamp assembly to the cycle handlebar, at least one of the one or more clamp fasteners having a head portion extending within a void defined by the bracket assembly, and wherein the bushing is disposed between the head portion and the bracket assembly.

5. A method of installing a cycle handlebar to a cycle steering mechanism comprising:
coupling an elastomeric first sleeve and an elastomeric second sleeve to the cycle handlebar,
coupling a bracket assembly to the first sleeve, the second sleeve and the cycle steering mechanism, wherein the bracket assembly is spaced apart from the cycle handlebar,
coupling a tension clamp assembly to the cycle handlebar and between the first sleeve and the second sleeve, wherein the tension clamp assembly is spaced apart from the bracket assembly,
placing a bushing around a tension clamp assembly fastener which extends into a void defined at least in part by a top bracket portion of the bracket assembly so that the bushing extends to and between the fastener and the top bracket portion, and
compressing the bushing between the bracket assembly and the tension clamp assembly.

6. A cycle handlebar mounting kit comprising:
an elastomeric first sleeve configured for disposal around a cycle handlebar,
a bracket assembly configured for being coupled to and between the first sleeve and a cycle steering mechanism,
a tension clamp assembly configured for receiving and clamping onto the cycle handlebar, and
a bushing,
wherein the bracket assembly and the tension clamp assembly are configured for compressing the bushing there between without directly contacting one another.

7. The kit of claim 6 wherein the bracket assembly includes a first bottom bracket including a first base portion, a first substantially U-shaped portion and a first opening extending through the first base portion and the first substantially U-shaped portion.

8. The kit of claim 7 wherein the bracket assembly includes a second bottom bracket including a second base portion, a second substantially U-shaped portion and a second opening extending through the second base portion and the second substantially U-shaped portion.

9. The kit of claim 6 wherein the bracket assembly includes a top bracket having a substantially U-shaped portion.

10. The kit of claim 6 including one or more clamp fasteners configured for coupling the tension clamp assembly to the cycle handlebar, at least one of the one or more clamp fasteners having a head portion configured for extending within a void defined by the bracket assembly, wherein the bushing is configured for placement around the head portion and between the bracket assembly and the head portion.

11. The kit of claim 6 wherein the tension clamp assembly includes a clamp arm configured for extending within a void defined at least in part by the bracket assembly and wherein the bushing is configured for placement around the clamp arm and between the clamp arm and the bracket assembly.

12. The kit of claim 6 including an elastomeric second sleeve configured for disposal around the cycle handlebar, wherein the bracket assembly is configured for being coupled to and between the second sleeve and the cycle steering mechanism.

13. The kit of claim of claim 6 including first fasteners configured for coupling the bracket assembly to the first sleeve, second fasteners configured for clamping the tension clamp onto the cycle handlebar and third fasteners configured for coupling the bracket assembly to the cycle steering mechanism.

* * * * *